US005852076A

United States Patent [19]

Serafin et al.

[11] Patent Number: 5,852,076

[45] Date of Patent: Dec. 22, 1998

[54] PROCESS FOR PREPARING A DISPERSION OF HARD PARTICLES IN SOLVENT

[75] Inventors: Mark Serafin, Apple Valley; Richard D. Olmsted, Vadnais Heights; Richard M. Fuller, Lake Elmo; Bhaskar V. Velamakanni, Woodbury; Zvi Rogovin, St. Paul, all of Minn.

[73] Assignee: Minnesota Mining and Manufacturing Company, St. Paul, Minn.

[21] Appl. No.: 967,273

[22] Filed: Nov. 7, 1997

Related U.S. Application Data

[63] Continuation of Ser. No. 555,671, Nov. 13, 1994, abandoned, which is a continuation-in-part of Ser. No. 338,679, Nov. 14, 1994, abandoned.

[51] Int. Cl.[6] .......... C08J 3/02

[52] U.S. Cl. .......... 523/315; 523/318; 523/343; 523/346; 366/150.1; 366/162.4; 366/162.5; 366/176.1; 252/62.51; 252/62.54

[58] Field of Search .......... 523/315, 318, 523/343, 346; 366/162.4, 162.5, 150.1, 176.1; 252/62.51, 62.54

[56] References Cited

U.S. PATENT DOCUMENTS

| | | | |
|---|---|---|---|
| 1,496,858 | 2/1924 | Knollenberg | 252/314 |
| 2,597,422 | 5/1952 | Wood | 241/16 |
| 3,526,391 | 9/1970 | Church, Jr. | 366/3 |
| 3,648,984 | 3/1972 | Mimura et al. | 366/108 |
| 3,761,311 | 9/1973 | Perrington et al. | 360/134 |
| 3,833,718 | 9/1974 | Reed et al. | 366/162.4 |
| 4,087,862 | 5/1978 | Tsien | 366/165.1 |
| 4,124,309 | 11/1978 | Yao | 366/340 |
| 4,348,432 | 9/1982 | Huang | 427/402 |
| 4,533,254 | 8/1985 | Cook et al. | 366/176.1 |
| 4,534,388 | 8/1985 | Pall et al. | 141/1 |
| 4,783,389 | 11/1988 | Trout et al. | 430/137 |
| 4,908,154 | 3/1990 | Cook et al. | 252/314 |
| 4,919,347 | 4/1990 | Kamiwano et al. | 241/65 |
| 5,026,427 | 6/1991 | Mitchell et al. | 106/31.6 |
| 5,028,450 | 7/1991 | Naka et al. | 427/9 |
| 5,110,463 | 5/1992 | Yuichi et al. | 210/194 |
| 5,199,640 | 4/1993 | Ursic | 239/11 |
| 5,244,149 | 9/1993 | Yuan et al. | 239/1 |
| 5,320,679 | 6/1994 | Derezinski et al. | 118/412 |
| 5,329,964 | 7/1994 | Derezinski | 137/561 A |
| 5,380,089 | 1/1995 | Karasawa | 366/162.4 |

FOREIGN PATENT DOCUMENTS

| | | |
|---|---|---|
| 0 101 007 A | 2/1984 | European Pat. Off. . |
| 0 535 781 A1 | 7/1992 | European Pat. Off. . |
| 401477 | 9/1924 | Germany . |
| 5-29663 | 11/1983 | Japan . |
| 64-79274 | 9/1987 | Japan . |
| 63-175029 | 7/1988 | Japan . |
| 5-59188 | 8/1991 | Japan . |
| 5-98192 | 10/1991 | Japan . |
| 58-27627 | 2/1993 | Japan . |
| 5-59324 | 3/1993 | Japan . |
| 5-112652 | 5/1993 | Japan . |
| 426734 | 6/1967 | Switzerland . |
| 2 063 695 | 10/1980 | United Kingdom . |
| 2 063 695 | 6/1981 | United Kingdom . |
| 2 079 614 | 1/1982 | United Kingdom . |
| 2 120 958 | 4/1983 | United Kingdom . |

OTHER PUBLICATIONS

"Applications of Impinging–Streams in Chemical Engineering Processes–Review", Abraham Tamir and Amir Kitron, Chem. Eng. Comm. 1987, vol. 50, pp. 241–330.

"Cutting with High–Pressure Abrasive Suspension Jets", Mohamed Hashish, 6th American Water Jet Conference, Aug. 24–27, 1991; Houston, Texas, Paper 33, pp. 439–455.

"Flow Visualization in a Particle Laden Jet Flow", Csaba K. Zoltani, Ali F. Bicen, Monte W. Coleman, Ballistic Research Laboratory, Technical Report BRL–TR–3134, Aug. 1990.

"Microfluidizer Processing Product Catalog", Microfluidics Corporation, Newton, MA, which includes Technical Bulletins for M–110Y Cell Disruption Microfluidizer, M–110EH Electric–Hydraulic Laboratory Microfluidizer, and M–210–EH Pilot Plant/Production Microfluidizer; (May 1993).

"Microfluidizing technology enhances emulsion stability" Robert J. Swientek, Reprinted from Food Processing, Jun. 1990.

"The Microfluidizer—a process advancement in biotechnology", Dr. Kamlesh P. Oza, Oct., 1990 Innovations in Pharmaceutical Sciences and Technology.

"Sterile Filtration of a Parenteral Emulsion", Deborah M. Lidgate, Thomas Trattner, Richard M. Shulz, and Richard Maskiewicz, Pharmaceutical Research, vol. 9, No. 7, 1992.

"Outline for Sub–Micro Disperser Operation", Gaulin Corporation, Everett, MA; 1989.

"Ultrasonic Dispersion of Pigment in Water Based Paints", James O. Stoffer and Maher Fahim, Journal of Coatings Technology, vol. 63, No. 797, Jun. 1991, pp. 61–68.

"Water Treatment Process for Waterjet Cutting", Robert McFaul, Culligan Intl. Co., USA, 6th American Water Jet Conference, Aug. 24–27, 1991, Houston, Texas, Paper 19, pp. 249–262.

(List continued on next page.)

*Primary Examiner*—Andrew E. C. Merriam
*Attorney, Agent, or Firm*—Eric D. Levinson

[57] ABSTRACT

A process and a high pressure apparatus are disclosed which are useful in preparing magnetic dispersions and other dispersions of hard, non-compliant particulates. The apparatus can be monitored for clogs and wear and allows for relatively quick and inexpensive replacement of orifices. The apparatus includes a high pressure pump and a series of impingement chambers comprising an input manifold where the process stream is split into two or more streams and an output manifold where the streams are recombined after passing through restrictive orifices configured in such a manner that the streams impinge on each other at high velocities. The orifices in each succeeding impingement zone are the same size or smaller than the orifices in the preceding impingement zone, and the orifices in the final impingement zone must be smaller than the orifices in the first impingement zone.

17 Claims, 3 Drawing Sheets

OTHER PUBLICATIONS

"Emulsification Using Orifice Plates", 35357, Research Disclosure, Sep. 1993, pp. 640–641.

"Homogenization and Emulsification", Gaulin Corporation, Research and Development Dept., Gaulin Technical Bulletin, T.B. #67, Sep. 1982.

"Multiple Pass Homogenization By Continuous Recycling ", Gaulin Technical Bulletin, T.B. #71, Nov., 1983.

"Typical Droplet–Size Distributions for Homogenizer, Hydroshear® and Colloid Mill", APV Gaulin Technical Bulletin, T.B. #73, Jan., 1985.

"Cell Disruption", Application Development Dept., APV Gaulin, Inc. Process Bulletin, SIC 20994.51, 1989.

"In–Plant Production of Wax Emulsions", Research & Development Department, Gaulin Technical Bulletin, Jun. 1, 1973.

"Pharmaceutical Products", R & D Department, Gaulin Processing Report, SIC 2834, Sep., 1982.

"The Effect of Air in Homogenizers", Gaulin Technical Bulletin, Technical Bulletin #31, Jun. 12, 1973.

"Microfluidics Announces New Diamond Interaction Chamber For Abrasive Materials" Microfluidics International Corporation, Liquid Assets, Feb. 1995.

"Microfluidics International Corporation Announces New Diamond Mixing Chamber" Microfluidics International Corporation, Friday, Mar. 10, 1994.

PROCESS FOR PREPARING A DISPERSION OF HARD PARTICLES IN SOLVENT

This is a continuation of application Ser. No. 08/555,671 filed Nov. 13, 1995, now abandoned, which is a continuation-in-part of application Ser. No. 08/338,679 filed Nov. 14, 1994, now abandoned.

FIELD OF THE INVENTION

This invention relates to a process and an apparatus for the production of dispersions of hard, non-compliant, and substantially non-deformable particulates in solvents. This invention relates especially to production of magnetic pigment dispersions.

BACKGROUND OF THE INVENTION

Dispersions of hard, non-compliant particulates may be used in various technologies, including such areas as abrasive coatings, inks, paints, color proofing, etc. One area where dispersions of hard, non-compliant particles are used is magnetic recording media, such as audio tapes, video tapes, data storage tapes, or computer diskettes. In making such magnetic recording media, typically a substrate is coated with magnetic pigment particles and polymeric binder dispersed in a solvent. The solvent is removed by drying leaving a layer of magnetic recording material.

Current compounding technology for the processing of magnetic pigment dispersions employs media mills, such as a ball mill, a sand mill, or an attritor. Media mills achieve acceptable magnetic pigment dispersions by subjecting the mixture to high intensity microshearing which is essential for breaking down agglomerations of the pigment particles. However, these media mill processing systems suffer from several disadvantages including media wear product contamination, e.g. sand particles in the dispersion. Furthermore, the processing rate for media mills is limited. If the flow-through rate in a media mill is increased, uneven grinding and dispersion occurs and much of the material leaves the system without being sufficiently processed. It would be desirable to avoid these disadvantages of media mill processing by using high pressure systems like homogenizers and emulsifiers.

Homogenizers and emulsifiers generally function by forcing a premix of solids and liquids to collide against a surface or against itself. Unfortunately, processing hard, non-compliant particle dispersions in high pressure emulsifiers has been difficult due to abrasiveness of the particles and the relatively large size of agglomerated structures which could plug the narrow gaps through which the mixture was forced. To avoid this clogging, U.S. Pat. Nos. 4,533,254 and 4,908,154 require filtration or preprocessing to reduce the size of the pigment and to ensure good dispersion of the pigment prior to use of a high pressure homogenizer or emulsifier.

In addition, the abrasiveness of magnetic pigment causes rapid wear on the impingement chambers. Difficulty in monitoring the prior art homogenizers or emulsifiers for wear or clogging and inability to inexpensively and quickly replace worn parts have been major obstacles to using high pressure devices.

Finally, prior art homogenizers or emulsifiers generally do not exceed operating pressures of 30,000 pounds per square inch (205 MPa), and, as a result, the amount of processing energy that could be applied to the mixture is limited. Note, however, that Japanese applications 05098192 and JP0509188 to Dainippon Ink & Chemical, which teach how to attain a colloidal suspension of a polymer, indicate a preference, however, for jet impingement pressures in the range of 1400–140,000 psi (9.8–980 MPa).

The prior art also teaches that a preconditioning process may advantageously be used prior to media milling during the preparation of magnetic pigment dispersions. This preconditioning process is usually carried out on a complete charge of the magnetic pigment, at least a portion of the solvent, and, optionally, a portion or all of the polymeric binder and other additives. Preconditioning improves subsequent handling and processing (milling, etc.) by promoting initial wetting of the pigments by surfactants, polymers, etc., and by displacing air from the surface of the particles. High speed mixers, homogenizers, kneaders, and planetary mixers have been used for this process.

A system where hard particles are forced through a series of decreasing size orifices has been used in the past to manufacture magnetic pigment dispersions.

SUMMARY OF THE INVENTION

The Inventors have created an improved jet impingement system which enables preparations of excellent dispersions of hard non-compliant particles. The present invention is a high pressure apparatus which can be used for preparing dispersions of hard, non-compliant particulates. The apparatus includes a high pressure pump and a series of at least two impingement chambers comprising an input manifold where the process stream is split into two or more streams and an output manifold where the streams are recombined after passing through restrictive orifices configured in such a manner that the streams impinge on each other at high velocities. The orifices in each succeeding impingement zone are the same size or smaller than the orifices in the preceding impingement zone, and the orifices in the final impingement zone must be smaller than the orifices in the first impingement zone. The inventors discovered that by using succeedingly smaller orifice sizes, good dispersions can be obtained and plugging problems can be minimized. In addition, the inventors have discovered that maintaining the distance from the exit of the orifice to the point of impingement (Di) at no more than two times the orifice diameter ($d_o$) for at least one impingement chamber enhances the dispersion quality.

Preferably, the orifice assemblies are set up in a manner that allows for vibration of the orifice assembly. Such a free supported orifice assembly experiences much less wear than do fixed orifices which are not free to vibrate. Specifically, while the inlet end of the orifice assembly may be fixed, it is desirable that the exit of the orifice assembly be free to vibrate.

The apparatus, can be monitored for clogs and wear (for example with pressure monitors). In addition, the apparatus allows for relatively quick and inexpensive replacement of orifices. This system is useful in preparing dispersions of hard particles, especially magnetic pigment dispersions.

Additionally, the present invention is a process of making a dispersion comprising a solvent and a hard, non-compliant particle, in which the process comprises the steps of:

a) combining the dispersion components to form a semi-dispersed mixture;

b) pressurizing the mixture; and c) forcing the pressurized mixture through a series of at least two impingement chamber assemblies, wherein for each impingement chamber assembly, the mixture is divided into at least two streams, each stream is forced through an orifice assembly, and on exit from the orifice assembly the streams impinge upon each other. The orifices are of decreasing diameters and the distance from the exit of the orifice to the point of impingement (Di) is no more than two times the orifice diameter ($d_o$)

Preferably, the dispersion comprises up to 60% by volume of hard, non-compliant particles.

DETAILED DESCRIPTION OF THE INVENTION

The present invention allows for preparation of a dispersion of hard, non-compliant particles without requiring preprocessing in media mills or pre-filtration. Hard, non-compliant particles mean particles which are substantially non-deformable. Examples of hard, non-compliant particles include, but are not limited to, magnetic pigments, such as iron oxides, barium ferrite, metal particles, and chromium dioxide; carbon black; many color pigments, such as, for example phthalocyanines, such as copper phthalocyanine, nigrosine dye, Aniline Blue, Chrome Yellow, Dupont Oil Red (from DuPont), Monoline Yellow, Sunfast Blue, Sun Yellow, Sun Red and other pigments available from Sun Chemical Co., Harmon Quindo Red, Regal 300, Fluorol Yellow 088, Fluorol Green Gold 084, Lumogen Yellow S 0790, Ultramarine Blue, Ultramarine Violet, Ferric Ferrocyanide, and other pigments available from BASF, Malachite Green Oxalate, lamp black, Rose Bengal, and Malastral Red; titanium dioxide; abrasive materials, such as aluminum oxide, silicon carbide, alumina, cerium oxide, zirconia, silica, boron carbide, and garnet; etc.

Figure 1:
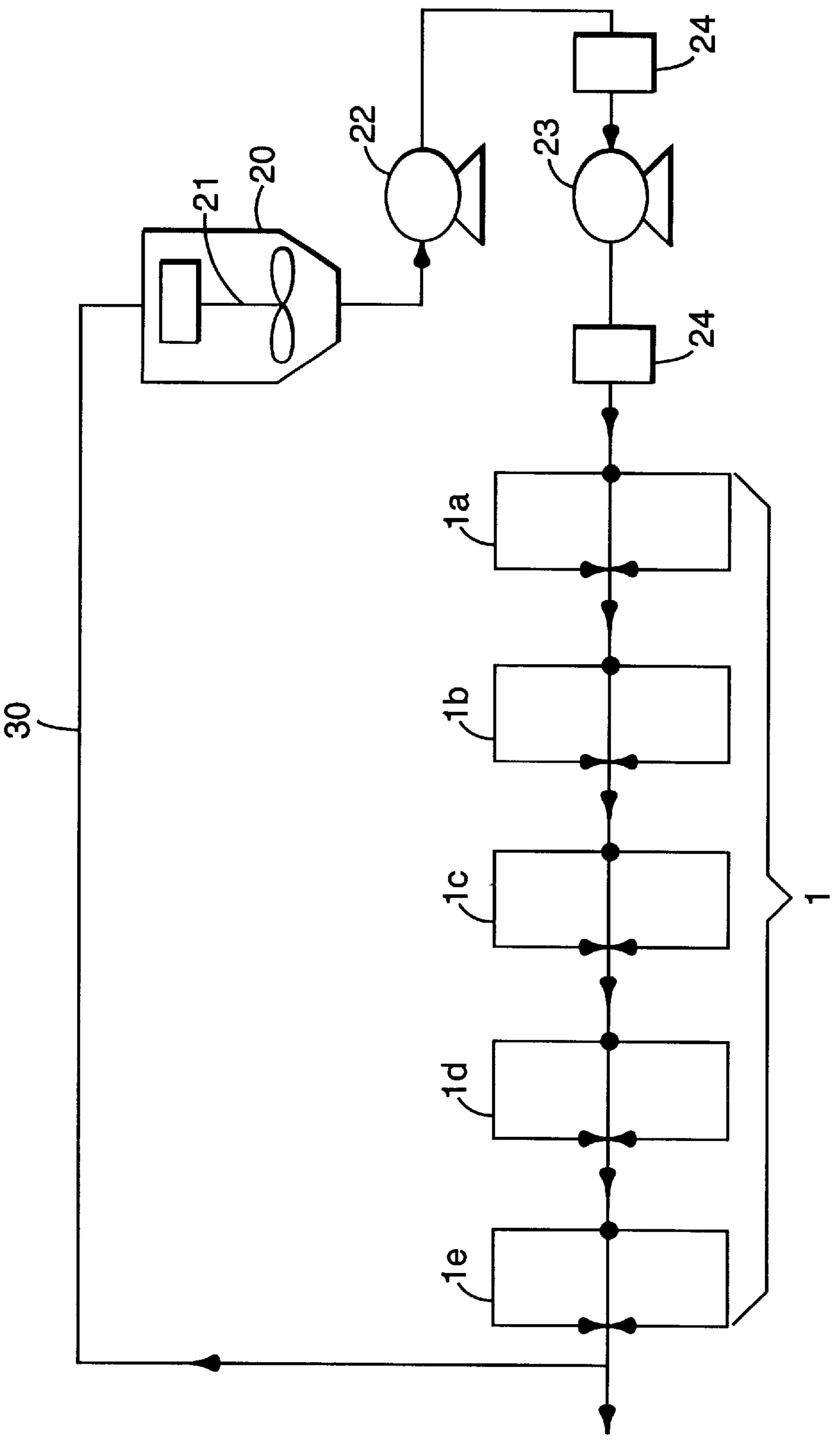
FIG. 1 is a schematic view of the entire apparatus of the present invention including a high pressure pump and a series of impingement zones.

With reference to FIG. 1, the process comprises adding hard, non-compliant particles, preferably magnetic pigment particles, a solvent, and optionally other materials to a vessel 20 and mixing them using any rough mixing element 21, such as a high speed, dissolver type mixer, into a semi-dispersed premix. Shar, Inc. D-5C mixer and Cowels mixer are two examples of mixers which work well. No further preprocessing (media milling or filtration) is necessary to prevent plugging of the high pressure jet impingement system by agglomerations of particles. Agglomerations up to about 60 mesh are still processable. The process mix preferably contains up to about 85% by weight solids, and, for magnetic pigments, preferably 20–50% by weight solids. On a volume basis, the amount of solids may be up to about 60 volume %. For magnetic pigment dispersions, the volume % is preferably in the range for 10–20 volume %. The maximum content of particles that is reasonably processable by the jet impingement system may be partially dependent on the type of particles being processed. For example, spherical alumina particles may be present in higher amounts, e.g. 80% by weight or 50% by volume, than acicular magnetic pigments. If another solid component, such as a polymeric binder, is used in addition to the hard, non-compliant particle, the maximum amount of hard non-compliant particle may decrease. In preparing a magnetic pigment dispersion with polymeric binder the % solids by volume may be in the range from about 5 to about 18%.

Use of double planetary mixers prior to jet impingement is a preferred embodiment. Using the double planetary mixer provides a relatively stable dispersion which facilitates subsequent jet impingement. When this step is performed the dispersion usually will not contain all the ingredients of the final dispersion. For example, this step may be performed on the pigment and a portion of the solvent alone or it may include all or some of various other dispersion components. The amount of solids used in the double planetary mixer is fairly high and dilution ofthe dispersion may be required before jet impingement. For example, for magnetic pigments 55–85% by weight or 12–40% by volume solids are processed in the double planetary mixer. Different magnetic pigments are preferably processed in different portions of this range. For example, metal pigments are preferably processed in the low end of the range, iron oxides are preferably processed in the middle of the range, and barium ferrite is preferably processed at the high end of the range. Due to the relatively high solids content after double planetary mixing, the dispersion may need to be diluted to the appropriate volume or weight % before further processing.

The premix is then fed to a high pressure pump 23, preferably via a low pressure pump 22 capable of generating approximately 50 to 150 psi (300–1000 kPa) of liquid head pressure. The pressure of the process stream, preferably, is raised to greater than 30,000 psi (205 MPa) by the high pressure pump 23. A hydraulically driven intensifier pump has been found to work well at even production level processing conditions, (flow rates>0.25 gallons per minute, pressure>30,000 psi). In order for the system to function it is necessary to have abrasive resistant check valves 24, which prevent backflow of the process stream, located both before and after the high pressure pump. The reliability of the intensifier pump is dependent upon the ability of the associated check valves to function over the full range of applied pressure and stroke rates. When processing abrasive materials, the erosion of valves, orifices, etc. caused by increased pressure and flow rates have limited the operating pressure and flow rate capabilities of prior art systems. Commercially available check valve designs, installed in prior art, production scale, processing systems have been found by the inventors to be unsuitable for functiong with dispersions of abrasive materials at pressures up to 60,000 psi and flow rate greater than 0.25 gallons per minute. Suitable check valves are disclosed for example in copending U.S. application Ser. No. 08/339,027.

The pressurized process stream then enters a series of impingement zones 1. The minimum number of individual jet impingement chamber assemblies 1$a$, etc. is two but there are preferably more than 4 individual jet impingement chamber assemblies and most preferably 6 to 9 individual jet impingement chamber assemblies. For magnetic pigment dispersions, the pressure drop across the series of impingement chambers preferably is at least 30,000 psi (205 MPa), more preferably greater than 35,000 psi (240 MPa) and most preferably greater than 40,000 psi (275 MPa). According to one preferred embodiment the pressure drop is largest across the last impingement chamber. If necessary or desired the dispersion or a portion of the dispersion can be recycled for a subsequent pass via stream 30.

Figure 2:
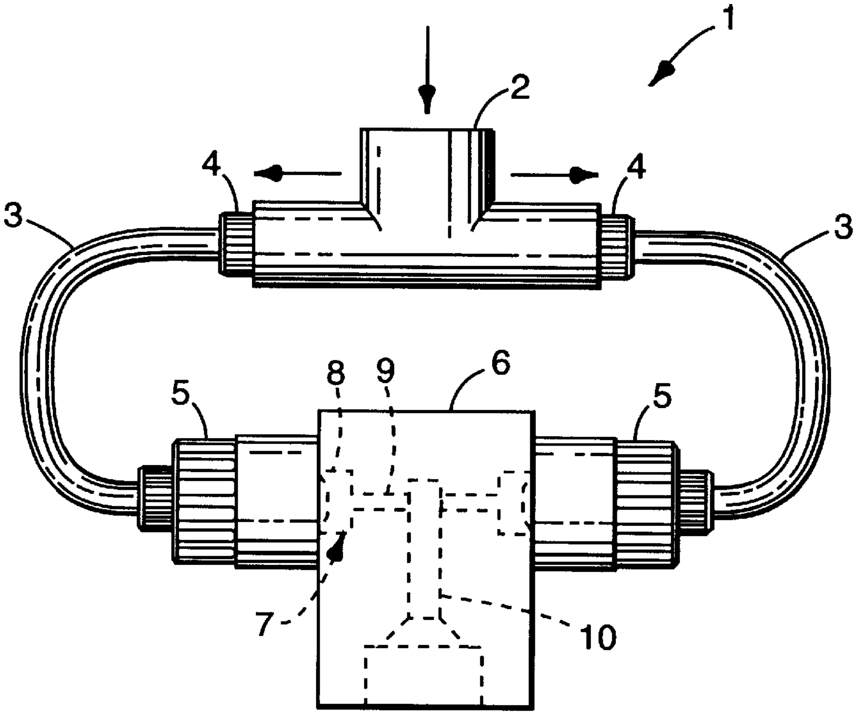
FIG. 2 is a schematic view of an individual impingement chamber assembly used in the apparatus of FIG. 1.

Referring to FIG. 2, the individual jet impingement chamber assemblies include an input manifold 2 in which the process stream is split into two or more individual streams, an output manifold 6 which contains the impingement chamber in which the individual streams are recombined, and a passage 3 directing the individual streams into the impingement chamber. FIG. 2 shows a preferred construction of the jet impingement chamber assembly where the process stream is divided into two independent streams. The input manifold 2 and the output manifold 6 are connected to high pressure tubing 3 by means of gland nuts 4 and 5. The output manifold 6 itself is preferably capable of disassembly so that the orifice cones 8 and extension tubes 9 may be replaced if different parameters are desired or if the parts are worn or plugged. The high pressure tubing 3 is optionally equipped with thermocouples and pressure sensing devices which enable the operator of the system to detect flow irregularities such as plugging. Impingement of the process streams occurs in the impingement channel 10.

In the impingement chamber the streams are recombined by directing the flow of each stream toward at least one other stream. In other words, if two streams are used the outlets must be in the same plane but may be at various angles from each other. For example, the two streams could be at 60, 90, 120, or 180 degree angles from each other, although any angle may be used. If four streams are used, two of the streams could be combined at the top of the impingement chamber and two more combined midway down the impingement channel 10 or all four streams could be combined at the top of the impingement chamber. While it is preferred that the orifice cone and extension tubes be perpendicular to the impingement channel, that is not required.

Figure 3:
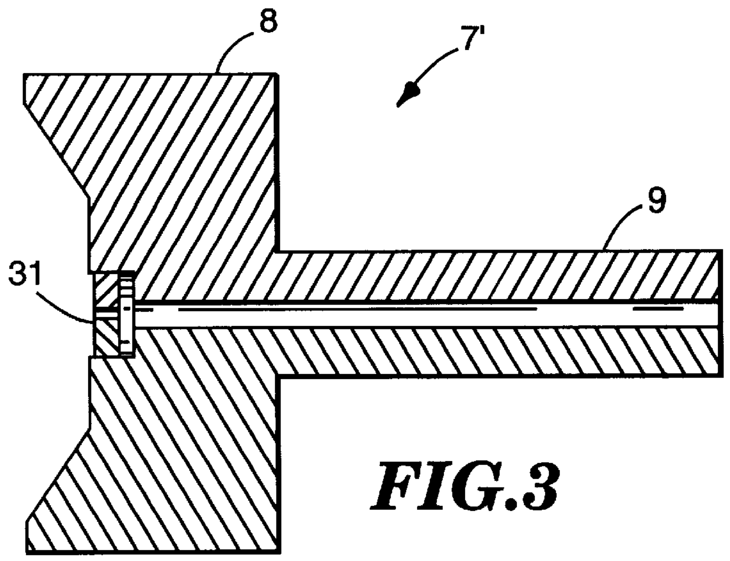
FIGS. 3–5 are cross-sectional side views of variations of orifice assemblies.
Figure 4:
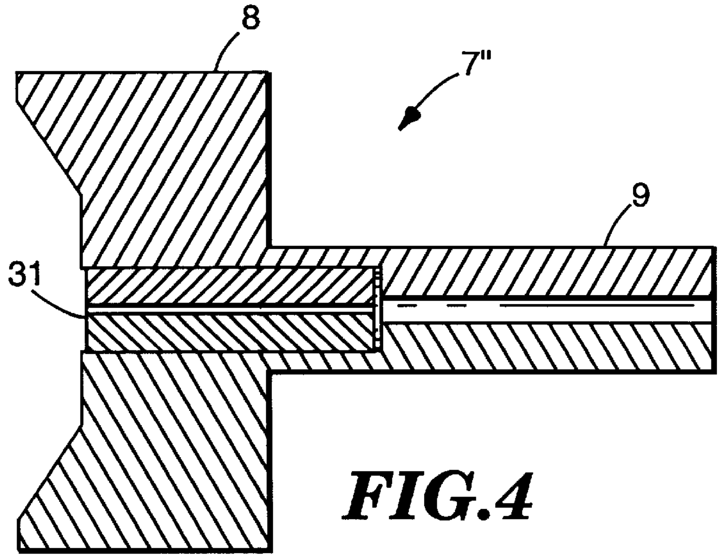
Figure 5:
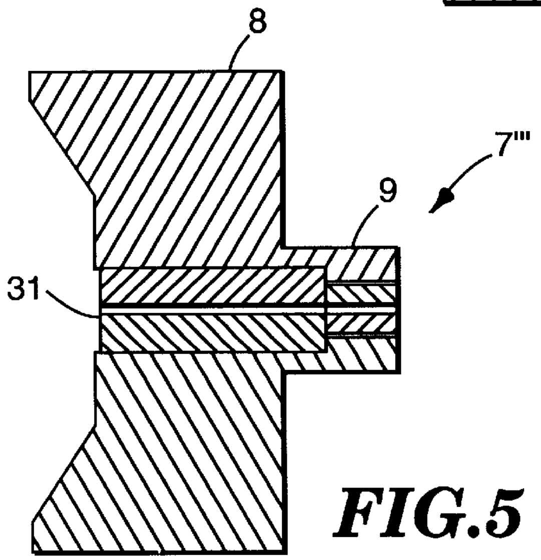

FIGS. 3 through 5 show a variety of embodiments of the jet impingement orifice assembly 7. Referring to FIGS. 3–5, the orifice cone 8 and the extension tube 9 may be separate components but are generally combined into one component. The orifice 31 is secured within the orifice cone 8. The orifice should be constructed of a hard and durable material. Suitable materials include sapphire, tungsten carbide, stainless steel, diamond, ceramic materials, cemented carbides, and hardened metal compositions. The orifice may be oval, hexagonal, square, etc. However, orifices that are roughly circular are easy to make and experience relatively even wear. As previously mentioned, it is desirable for the exit of the orifice assembly to be free to vibrate. For example, with a tungsten carbide orifice in a stainless steel sleeve, the distance from the point of rigid support of the orifice assembly to the point where the dispersion exits the orifice is preferably at least 13 times the distance to the point of impingement, Di.

The average inner diameter of the orifice is determined in part by the size of the individual particulates being processed. For preparation of a magnetic pigment dispersion preferred orifice diameters range from 0.005 through 0.05 inches (0.1–1 mm). It is preferable that the orifice inner diameter in each succeeding impingement chamber is the same size or smaller than the orifice inner diameter in the preceding impingement chamber. The length of the orifice may be increased if desired to maintain a higher velocity for the process stream for a longer period of time. The velocity of the stream when passing through the final orifice is generally greater than 1000 ft/sec (300 m/s).

The extension tube 9 maintains the velocity of the jet until immediately prior to the point where the individual streams impinge each other. The inner portion of the extension tube may be of the same or different material than the orifice and may be of the same or slightly different diameter than the orifice. The length of the extension tube and the distance from the exit of the extension tube to the center of the impingement chamber has an effect on the degree of dispersion obtained. For magnetic pigment dispersions the distance from the exit of the extension tube to the center of the impingement zone is preferably no greater than 0.3 inches (7.6 mm), more preferably no greater than 0.1 inches (2.54 mm), and most preferably no greater than 0.025 inches (0.6 mm).

Figure 6:
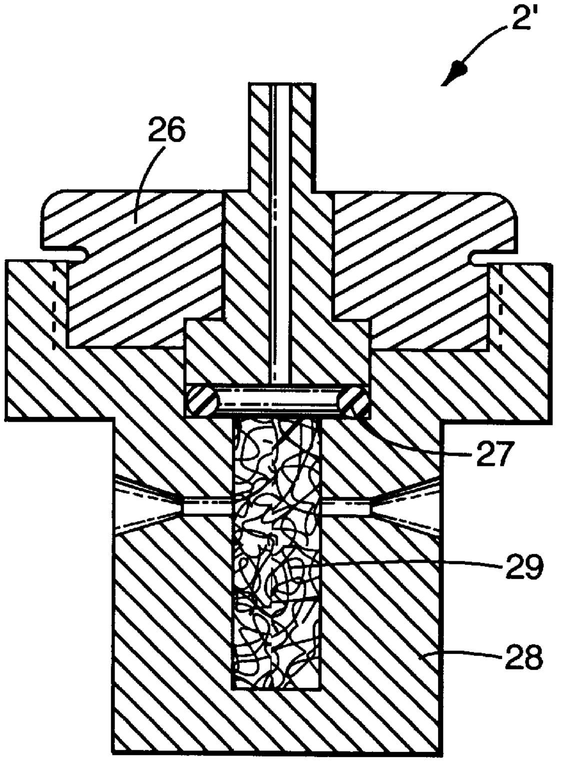
FIG. 6 is a cross-sectional view of an alternative input manifold.

The inventors have found that, although not necessary, it may be beneficial to provide a filter upstream from the initial impingement chamber assembly. The purpose of this filter is primarily to remove relatively large (i.e., greater than 100μm) contaminants without removing pigment particles. As an alternative to this, the inventors have developed a modified input manifold 2' as shown in FIG. 6 which comprises a filter. This input manifold 2' comprises a removable cover means 26 which allows for removal and replacement of the filter element 29 which is held in the housing 28. A sealing element 27 prevents the process material from leaking out of the input manifold.

In addition, the inventors have found that use of this jet impingement system enables one to pass the processed dispersion through ultrarestrictive filters. Ultrarestrictive filters, for the purpose of this invention, are filters capable of removing 0.8 μm particles at about 99% efficiency. Preferably, the filters used in this process remove about 99% of 0.6 μm particles, more preferably about 99% of about 0.5 μm particles. Use of such ultrarestrictive filters with dispersions of relatively high solids content, 20–50% by weight, is feasible without need for unduly frequent changes of filters due to the decrease in viscosity and the breakdown of particle agglomerations attained in the jet impingement portion of the process.

Commercially available examples of suitable ultrarestrictive filters include Nippon Roki HT-04, HT-05, HT-06 and HT-08. Use of a series of these filters may be desirable, and four of these filters, having increasing restrictivity, in series has been found to work well.

The process and apparatus of the present invention may be used to prepare dispersions of most solids in a liquid. However, it is particularly well suited for preparing dispersions of hard, non-compliant particles. The sizes of the orifice and extension tubes may need to be adjusted if the particle sizes vary. Typically a magnetic pigment dispersion will include magnetic pigment particles, solvent, polymeric binder, and various other additives such as lubricants.

In addition to using this process and apparatus as a method of forming a magnetic dispersion, the Inventors have found that this use of a series of high pressure jet impingement chamber assemblies provide excellent preconditioning which may be followed by either conventional preparation of a magnetic dispersion by media milling or by additional jet impingement processing.

EXAMPLES

Example 1

A slurry consisting of 47% by weight cobalt modified γ-$Fe_2O_3$, 1.5% by weight dispersing lubricant (Emcol and POCA) in solid form, 2.5% by weight carbon black, and 49% by weight tetrahydrofuran was premixed in a Shar, Inc. D-5C. The mixture was then pumped to an intensifier pump and pressurized to between 25,000 and 45,000 psi. The pressurized mixture was forced through a series of four jet impingement assemblies each with a smaller orifice inner diameter than the preceding jet impingement assembly. The inner orifice diameters were 0.030 in. (0.76 mm), 0.026 in. (0.66 mm), 0.022 in. (0.56 mm) and 0.018 in. (0.46 mm). The flow rate was kept constant at 1.268 gal/min (4.8 l/min).

Five cycles were performed; i.e., the slurry was processed through the system five times. Four runs were made each with a different distance from the exit of the extension tube to the center line of the impingement channel (hereinafter "free distance"). Measurements of 45 degree gloss, input pressure, measured just upstream from the first impingement chamber assembly, and output temperature of the slurry, measured by a high pressure thermocouple placed immediately after the final impingement zone were taken for each cycle.

The results are shown in Tables 1–3. The 45 degree gloss measurements demonstrate that as the free distance is reduced the quality of the dispersion improves. Meanwhile the output temperature and input pressure when the free distance was 0.025 inches (0.635 mm) were significantly higher than when greater free distances were used. There was no significant pressure difference between slurries when the 0.1 inch (2.54 mm), 0.3 inch (7.62 mm), and 0.4 inch (10.2 mm) free distances were used.

TABLE 1

EFFECT OF FREE DISTANCE TO IMPINGEMENT POINT FERROMAGNETIC DISPERSION 45° GLOSS

| | Distance to Impingement | | | |
|---|---|---|---|---|
| Process Cycle | 0.4" (10.2 mm) | 0.3" (7.62 mm) | 0.1" (2.54 mm) | 0.025" (0.635 mm) |
| Pass 1 | 26.8 | 34.6 | 41.5 | 42.5 |
| Pass 2 | 34.0 | 47.7 | 51.5 | 54.5 |
| Pass 3 | 47.5 | 51.8 | 56.0 | 59.0 |
| Pass 4 | 50.7 | 50.4 | 59.5 | 62.8 |
| Pass 5 | 53.6 | 53.4 | 61.0 | 64.8 |

TABLE 2

EFFECT OF FREE DISTANCE TO IMPINGEMENT POINT FERROMAGNETIC DISPERSION/INPUT PRESSURE RESPONSE MPa

| | Distance to Impingement | | | |
|---|---|---|---|---|
| Process Cycle | 0.4" (10.2 mm) | 0.3" (7.62 mm) | 0.1" (2.54 mm) | 0.025" (0.635 mm) |
| Pass 1 | 216 | 226 | 198 | 258 |
| Pass 2 | 192 | 182 | 193 | 266 |
| Pass 3 | 205 | 189 | 189 | 261 |
| Pass 4 | 212 | 187 | 180 | 273 |
| Pass 5 | 219 | 217 | 183 | 286 |

TABLE 3

EFFECT OF FREE DISTANCE TO IMPINGEMENT POINT FERROMAGNETIC DISPERSION/INPUT TEMPERATURE RESPONSE °C.

| | Distance to Impingement | | | |
|---|---|---|---|---|
| Process Cycle | 0.4" (10.2 mm) | 0.3" (7.62 mm) | 0.1" (2.54 mm) | 0.025" (0.635 mm) |
| Pass 1 | 38 | 49 | 89 | 108 |
| Pass 2 | 37 | 39 | 86 | 106 |
| Pass 3 | 39 | 37 | 94 | 111 |
| Pass 4 | 41 | 36 | 97 | 121 |
| Pass 5 | 43 | 38 | 97 | 123 |

Example 2

A slurry consisting of 41.2% by weight cobalt doped $\gamma$-$Fe_2O_3$, 2.8% dispersing lubricant in solid form, 43.4% by weight methyl ethyl ketone, and 12.6% cyclohexanone was processed through a series of 4 jet impingement assemblies each with a smaller orifice inner diameter than the preceding jet impingement assembly. The inner orifice diameters were 0.030 in. (0.76 mm), 0.026 in. (0.66 mm), 0.022 in. (0.56 mm) and 0.018 in. (0.46 mm). The flow rate was kept constant at 1.268 gal/min (4.8 l/min). Five cycles were performed; i.e., the slurry was processed through the system five times. The structure of the orifice assembly for the first three impingement zones is shown in FIG. 3. The inner diameter of the extension tubes in the first three impingement chambers was 0.025 inches (0.635 mm). In the first run, the structure for the orifice assembly in the forth impingement assembly was as shown in FIG. 3, with an orifice length of 0.030 inches (0.76 mm). In the second run, the structure of the orifice assembly was as shown in FIG. 4 with an extended orifice of length 0.250 inch (6.3 mm).

The results are shown in Tables 4–6. The dispersion which was forced through the system having a longer orifice length in the last impingement assembly had higher gloss response, indicating better dispersion. In addition, the temperature and pressure responses were also increased for the dispersion that was forced through a longer restrictive orifice.

TABLE 4

EFFECT OF ORIFICE LENGTH ON FERROMAGNETIC DISPERSION 45° GLOSS

| | Length of Orifice | |
|---|---|---|
| Process Cycle | 0.030"(0.76 mm) | 0.250"(6.3 mm) |
| Pass 1 | 58.3 | 62.2 |
| Pass 2 | 56.0 | 65.4 |
| Pass 3 | 60.5 | 64.5 |
| Pass 4 | 61.5 | 69.4 |
| Pass 5 | 61.3 | 70.1 |

TABLE 5

EFFECT OF DIAMETER OF ORIFICE LENGTH ON FERROMAGNETIC DISPERSION/INPUT PRESSURE RESPONSE MPa

| | Length of Orifice | |
|---|---|---|
| Process Cycle | 0.030"(0.76 mm) | 0.250"(6.3 mm) |
| Pass 1 | 252 | 267 |
| Pass 2 | 214 | 236 |
| Pass 3 | 201 | 228 |
| Pass 4 | 193 | 222 |
| Pass 5 | 208 | 201 |

TABLE 6

EFFECT OF ORIFICE LENGTH FERROMAGNETIC DISPERSION/TEMPERATURE RESPONSE °C.

| | Length of Orifice | |
|---|---|---|
| Process Cycle | 0.030"(0.76 mm) | 0.250"(6.3 mm) |
| Pass 1 | 109 | 121 |
| Pass 2 | 106 | 108 |

TABLE 6-continued

| EFFECT OF ORIFICE LENGTH FERROMAGNETIC DISPERSION/TEMPERATURE RESPONSE °C. | | |
|---|---|---|
| | Length of Orifice | |
| Process Cycle | 0.030"(0.76 mm) | 0.250"(6.3 mm) |
| Pass 3 | 101 | 110 |
| Pass 4 | 98 | 108 |
| Pass 5 | 95 | 101 |

Example 3

A ferromagnetic pigment slurry consisting of 29.9% by weight Methyl ethyl ketone, 10.8% toluene, 11.8% cyclohexanone, 2.2% dispersing agents in solid form, 30.7% cobalt doped γ-$Fe_2O_3$, 9.4% urethane binder solution (30% solids by weight in MEK), 3.0% vinyl binder solution (32% solids by weights in MEK), and 5% head cleaning agent based on metal pigment weight was processed through a series of 4 jet impingement assemblies. The first two jet impingement chambers had orifice assemblies as shown in FIG. 3, with inner orifice diameters of 0.030 inches and 0.022 inches (0.76 and 0.56 mm). The final two jet impingement chambers had orifice assemblies as shown in FIG. 4 with an extended length sapphire tube which had an inner diameter of 0.018 inches (0.46 mm). The flow rate was adjusted to maintain various target pressures. Four runs were made maintaining pressure levels at the inlet to the first jet impingement assembly of 18,000; 24,000; 30,000; and 36,000 psi (123; 164; 205; and 246 MPa). The 45 degree Gloss response increases with increased operating pressure, indicating that the quality of the dispersion improves with increased operating pressure.

Example 4

A ferromagnetic pigment slurry consisting of 82.8 parts by weight Methyl ethyl ketone, 29.6 parts by weight toluene, 32.2 parts by weight cyclohexanone, 6.0 parts by weight dispersing agents in solid form, and 100 parts by weight cobalt doped γ-$Fe_2O_3$ were preconditioned according to one of the following methods:

Sample HS: 5 hours high speed mixing in a Ross Versamixer having an anchor blade (6" (15.2 cm) diameter blade) set at 80 rpm, a disk disperser set at 2500 rpm, and a homomixer set at 2945 rpm.

Sample DP/HS: 3 hours mixed at 71.0% solids in a double planetary mixer having a blade tip speed of 115 ft/min (35 m/min) followed by dilution with solvent to 42.3% solids and 2 hours in a Ross Versamixer having an anchor blade (6" diameter blade) set at 80 rpm, a disk disperser set at 2500 rpm, and a homomixer set at 2945 rpm.

Sample HS/JI: 2 hours in a Ross Versamixer having an anchor blade (6" diameter blade) set at 80 rpm, a disk disperser set at 2500 rpm, and a homomixer set at 2945 rpm, followed by 3 hours of recirculation through a series of jet impingers at a flow rate of about 1.2 gallons per minute (4.5 l/min) and pressures of about 41,000 psi (282 MPa). There were six impingement zones having orifice inner diameters of 0.076 cm, 0.056 cm, and four zones having orifice inner diameters of 0.046 cm.

These dispersions were tested for high shear viscosity in centipoise (cP) on an ICI viscometer at 10,000 r/s. The dispersions were also hand coated onto PET film and dried. The gloss, goodness number (GN, a dimensionless value of coercivity given by coercivity divided by coercivity at half peak height), Retentivity (Br, which is the maximum value of residual flux density corresponding to saturation flux density, squareness (Sq, see U.S. Pat. No. 5,081,213, col. 11), and Roden Stock (Sn) of the handspreads were measured. The results are shown below:

| Sample | Viscosity | GN | Gloss | Br | Sq | RS |
|---|---|---|---|---|---|---|
| HS | 10 | 2.13 | 22 | 1226 | 0.77 | 25 |
| DP/HS | 19 | 2.20 | 35 | 1409 | 0.79 | 19 |
| HS/JI | 7 | 2.45 | 60 | 1610 | 0.83 | 7.5 |

The dispersions that were preconditioned by jet impingement showed better viscosity, goodness number, gloss, retentivity, squareness and Sn than did the other samples.

Example 5

A ferromagnetic pigment slurry consisting of 82.8 parts by weight Methyl ethyl ketone, 29.6 parts by weight toluene, 32.2 parts by weight cyclohexanone, 6.0 parts by weight dispersing agents in solid form, and 100 parts by weight cobalt doped γ-$Fe_2O_3$ were preconditioned by either high shear mixing in a Ross Versamixer or mixing in a double planetary mixer. Vinyl binder (9.2 weight % based on weight of oxide) and polyurethane binder (about 12 weight % based on weight of oxide) along with additional solvent were added to the preconditioned mixture. Final volume % solids was less than 20%.

The complete mixture was then processed through either a sand mill or a high pressure jet impingement system. The sample are as follows:

| Sample | Premix Method | Dispersion Method |
|---|---|---|
| 6A | Versamixer | sandmill |
| 6B | Versamixer | jet impingement |
| 6C | double planetary | sandmill |
| 6D | double planetary | jet impingement |

Handspreads of the various dispersions were made and tested for coercivity (Hc), Retentivity (Br), Goodness number (GN, a dimensionless measure of coercivity given by the coercivity divided by the width of the coercivity at ½ peak height), squareness (Sq), gloss, and Roden Stock (RS). The dispersions were also tested for viscosity. The results are shown below:

TABLE 7

| Sample | Hc | Br | GN | Sq | gloss | RS | Viscosity |
|---|---|---|---|---|---|---|---|
| 6A | 775 | 1315 | 1.93 | 0.764 | 41 | 10.7 | 40 |
| 6B | 764 | 1413 | 2.16 | 0.798 | 50 | 9.6 | 17 |
| 6C | 768 | 1340 | 2.01 | 0.787 | 47 | 9.9 | 45 |
| 6D | 751 | 1277 | 2.14 | 0.797 | 45 | 10.9 | 26 |

Particle Size Analysis

Particle size analysis of dispersions are an indication of the reduction of agglomerates during processing. Two methods are used depending on the size range of the particles being analyzed, Microtrac™ and Photon Correlation Spectroscopy (PCS). Microtrac™ is used when the range is between 0.2 micron and 700 microns. Solvent similar to that used in a sample is recirculated through a Microtrac™ X100 (available from Leeds and Northrup, St. Petersburg, Fla.) and the sample is dropwise added until the concentration (typically around 1 volume percent) is sufficient for the machine to produce a particle size analysis. Laser light is passed through the diluted sample, the forward scatter is measured, and output is reported as a number average particle size (Mn). a volume average particle size (Mv), and a volume particle size distribution. PCS is used when the particle size range is less than three microns. A sample is diluted with similar solvent to a concentration (typically around 0.01 volume percent) sufficient to measure between 60,000 and 120,000 counts per second when placed in a Malvern Photon Correlation Spectroscopy 4700 (available from Malvern Instruments, Inc., Southboro, Mass.). Laser light is passed through the diluted sample, the light is scattered light by the diffusing particles moving under Brownian motion, and the intensity is reported as an average particle size or Zave, similar to a Microtrac™ Mn.

Example 6

A pigment slurry was prepared by first adding 14.5 parts BUTVAR™ B-98 (a resin available from Monsanto Company, St. Louis, Mo.), 14.5 parts JONCRYL™ 67 (a resin available from S. C. Johnson & Son, Inc. Racine, Wis.), 7.3 parts DISPERBYK™ 161 (a dispersant, 30 percent in n-butyl acetate, available from BYK Chemie, Wallingford, Conn.), and 0.15 parts FLUORAD™ FC-430 (a coating additive available from 3M Company, St. Paul, Minn.), to 252.0 parts 2-butanone (a solvent available from Ashland Chemical Co., Columbus, Ohio) and 168.0 parts GLYCOL ETHER PM™ (a solvent available from Ashland Chemical Co.); stirring with an air mixer for 30 minutes until the resins are dissolved. Then 43.6 parts of SUNFAST BLUE™ 248-0615 (a pigment available from Sun Chemical Corp., Cincinnati, Ohio) was added and stirred until the slurry appeared uniform. The slurry was placed in a feed hopper, pressurized with a pneumatic pump to between 97 and 110 MPa (14,000 and 16,000 psi) and forced through a series of three jet impingement assemblies each with a smaller orifice inner diameter than the preceding jet impingement assembly. The inner orifice diameters were 0.46 mm (0.018 in.), 0.30 mm (0.012 in.), and 0.23 mm (0.009 in.). The flow rate was kept constant at 400 cc/min. and the slurry was recirculated through the series of impingement assemblies and back to the feed hopper for 42.9 cycles with 2 cc samples takes at various intervals beginning at 2.9 cycles. The impingement assemblies were immersed in a mixture of ice and water such that the slurry temperature, measured by a thermometer placed in the feed hopper, was 36° C. at 7 cycles and 40° C. at 34 cycles. Particle size measurements were made by Microtrac™ and PCS for each sample. Each sample was coated with a Number 6 Meyer Rod to a 14 micron wet coating thickness within 4 hours of being withdrawn from the feed hopper, dried for 2 minutes at 93° C. in an air circulating oven, and tested for transparency. In color proofing, the overlay sequence of color requires minimum transparency levels so that the opacity of one color does not dominate and mask out the contribution on another color. A millbase is coated onto a 51 micron (0.002 in.) thick polyethyleneterephthalate film sheet, oven dried, and placed over the white surface. The reflected optical density of the mill base is measured with an appropriately filtered Model SPM 100 Spectrophotometer/Densitometer (available from Gretag Ltd., Regensdorf, Switzerland) and spots are marked that have a target reflected optical density for specific millbase colors, i. e., 1.32 for cyan colors. The spots with the target reflected optical density are then placed over a black hole or light trap. The transparency of the millbase is measured with the same device used to measure the reflected optical density. The higher the transparency number, the better the pigment in the millbase is dispersed.

The particle size and transparency measurements are shown in Table 8. The number average particle size decreased to 0.2 micron after 3 cycles illustrating that the agglomerates were largely reduced to individually dispersed pigment particles. The transparency measurements continued to improve for 17 cycles illustrating that the remaining agglomerates were substantially reduced.

TABLE 8

EFFECT OF CYCLES ON NUMBER AVERAGE PARTICLE SIZE AND TRANSPARENCY

| Cycle | Microtrac ™ Mn (micron) | PCS Zave (micron) | Transparency |
|---|---|---|---|
| 0 | 1.23 | | — |
| 2.9 | 0.210 | | 1.880 |
| 5.7 | 0.189 | | 1.952 |
| 17.1 | 0.202 | 0.223 | 2.069 |
| 34.3 | | 0.246 | 2.100 |
| 42.9 | | 0.219 | 2.086 |

Example 7

A silver halide-silver behenate dispersion was prepared by first adding 15.1 parts of silver halide-silver behenate (9:91 molar ratio) dry soap prepared by a procedure described in U.S. Pat. No. 3,839,049 and 2.8 parts BUTVAR™ B-79 (a resin available from Monsanto Company), to 65.7 parts 2-butanone and 16.4 parts toluene; letting the mixture soak for 12 hours; and stirring with a SILCERSON™ Model L2AIR Heavy Duty Laboratory Mixer Emulsifier (available from Silverson Machines, Ltd.) for 2 hours until a uniform slurry was made. The slurry was added to a feed hopper and then pressurized with a hydraulic pump to 134 MPa (19,500 psi) and forced through a series of two jet impingement assemblies the second with a smaller orifice inner diameter than the first jet impingement assembly. The inner orifice diameters were 0.56 mm (0.022 in.) and 0.46 mm (0.018 in). The flow rate was kept constant at 3.8 L/min. Particle size measurements were made by Microtrac™ for both the initial slurry and the slurry after one pass through the jet impingement assemblies.

The particle size measurements are shown in Table 9. The volume average particle size decreased from 20.8 micron to 1.2 microns after 1 pass and the distribution of the particles sizes illustrating that the agglomerates were substantially reduced to individually dispersed pigment particles.

TABLE 9

EFFECT OF CYCLES ON VOLUME AVERAGE PARTICLE SIZE AND PARTICLE SIZE DISTRIBUTION

| Cycles | Microtrac ™ Mv (micron) | 10% of particle volume | 50% of particle volume | 90% of particle volume |
|---|---|---|---|---|
| 0 | 20.79 | 0.51 | 0.51 | 57.68 |
| 1 | 1.18 | 0.54 | 0.54 | 1.83 |

Comparative Example 1

A silver halide-silver behenate dispersion was prepared substantially as in Example 7 except different process conditions and jet assemblies that did not involve impingement were used. The slurry added to a feed hopper and then pressurized with a pneumatic pump to 28 MPa (4000 psi) and forced through a series of two jet assemblies the second with a smaller orifice inner diameter than the first jet assembly. The inner orifice diameters were 0.76 mm (0.030 in.) and 0.25 mm (0.010 in). The flow rate was kept constant at 400 cc/min. Particle size measurements were made by Microtrac™ for both the initial slurry and the slurry after one pass through the jet assemblies.

The particle size measurements are shown in Table 10.

TABLE 10

EFFECT OF CYCLES ON VOLUME AVERAGE PARTICLE SIZE AND PARTICLE SIZE DISTRIBUTION

| Cycles | Microtrac ™ Mv (micron) | 10% of particle volume | 50% of particle volume | 90% of particle volume |
|---|---|---|---|---|
| 0 | 20.79 | 0.51 | 0.51 | 57.68 |
| 1 | 5.60 | 0.27 | 0.74 | 4.91 |

Example 8

Three abrasive slurries were prepared by adding different amounts of Sumitomo AKP-50 Alumina (available from Sumitomo Chemical Company, New York, N.Y.), to water that was previously adjusted to a pH of 3 with 1N hydrochloric acid and mixing each in a Gardner Dispermat F105 (available from BYK-Gardner, Inc., Silver Spring, Md.). Alumina slurry A consisted of 63 parts by weight (30 parts by volume) alumina and 37 parts by weight (70 parts by volume) pH 3 water, alumina slurry B consisted of 73 parts by weight (40 parts by volume) alumina and 27 parts by weight (60 parts by volume) pH 3 water, and alumina slurry C consisted of 80 parts by weight (50 parts by volume) alumina and 20 parts by weight (50 parts by volume) pH 3 water. Each slurry was processed in a similar manner. Approximately 250 cc of the slurry was placed in a feed hopper, pressurized with a pneumatic pump to about 172 Mpa (25,000 psi) for Slurry A, 183 Mpa (26,500 psi) for Slurry B, and 186 Mpa (27,000 psi) for Slurry C, and forced through a series of three jet impingement assemblies each with a smaller orifice inner diameter than the preceding jet impingement assembly. The inner orifice diameters were 0.46 mm (0.018 in.), 0.30 mm (0.012 in.), and 0.23 mm (0.009 in.). A fixed free distance of 1.27 mm (0.05 in.) was used. The flow rate was kept approximately constant at about 150 cc/min. for Slurry A, 130 cc/min. for Slurry B, and 125 cc/min. for Slurry C. Each slurry was recirculated through the series of impingement assemblies and back to the feed hopper for 18 cycles with 2 cc samples taken at various intervals beginning at 2 cycles. The impingement assemblies were immersed in a mixture of ice and water such that the final slurry temperatures, measured by a thermometer placed in the feed hopper, were between 45° C. and 55° C. Particle size measurements were made by Microtrac™ for each sample.

The particle size measurements for Alumina Slurry A, B, and C are shown in Table 1, 2, and 3 respectively. The volume average particle size decreased steadily illustrating that the agglomerates were largely reduced to individually dispersed pigment particles.

TABLE 11

EFFECT OF CYCLES ON VOLUME AVERAGE PARTICLE SIZE AND PARTICLE SIZE DISTRIBUTION ON SLURRY A

| Cycles | Microtrac ™ Mv (micron) | 10% of particle volume | 50% of particle volume | 90% of particle volume |
|---|---|---|---|---|
| 0 | 1.89 | 0.21 | 0.31 | 1.32 |
| 3 | 1.03 | 0.36 | 0.88 | 1.78 |
| 6 | 1.29 | 0.49 | 1.12 | 2.38 |
| 12 | 0.55 | 0.20 | 0.25 | 1.17 |
| 18 | 0.58 | 0.20 | 0.29 | 1.21 |

TABLE 12

EFFECT OF CYCLES ON VOLUME AVERAGE PARTICLE SIZE AND PARTICLE SIZE DISTRIBUTION ON SLURRY B

| Cycles | Microtrac ™ Mv (micron) | 10% of particle volume | 50% of particle volume | 90% of particle volume |
|---|---|---|---|---|
| 0 | 1.03 | 0.15 | 0.42 | 2.23 |
| 2.6 | 0.78 | 0.16 | 0.26 | 1.80 |
| 5.2 | 0.58 | 0.14 | 0.25 | 1.25 |
| 10.4 | 0.59 | 0.19 | 0.24 | 1.31 |
| 15.6 | 0.51 | 0.14 | 0.24 | 1.10 |

TABLE 13

EFFECT OF CYCLES ON VOLUME AVERAGE PARTICLE SIZE AND PARTICLE SIZE DISTRIBUTION ON SLURRY C

| Cycles | Microtrac ™ Mv (micron) | 10% of particle volume | 50% of particle volume | 90% of particle volume |
|---|---|---|---|---|
| 0 | 1.89 | 0.51 | 1.37 | 3.08 |
| 2.5 | 1.17 | 0.32 | 0.99 | 2.13 |

Inkjet Ink Evaluation

Pigmented inks have excellent light fastness and exterior durability and should be relatively free from agglomerates for satisfactory performance. In addition, pigmented inks used in inkjet applications should be resistant to reagglomeration over time to avoid clogging the inkjet nozzles of inkjet printers. The long term printability of an inkjet ink were evaluated by one of two tests, 1) the less stringent Color Stripe Test and 2) the more stringent Full Cartridge Life Test. In both cases approximately 40 mL of pigmented inkjet ink was placed in an HP 51626A Cartridges which in turn was placed in a Nova Jet II Thermal Inkjet Printer (available from Encad in San Diego, Calif.). In the Color Stripe Test, a solid block image 1.9 cm long by 86 cm wide was printed in a 4 pass-mode at time intervals of 0, 0.5, 1, 2, 4, 6, 10, 12, and 16 weeks. The test was run until the print quality began to deteriorate and noticeable banding was observed. The last time interval in which satisfactory print quality was observed was then reported. In the Full Cartridge Life Test, a solid block image 91 cm long by 86 cm wide was printed until all the ink in the cartridge was exhausted or the print quality began to deteriorate. Normally, 40 mL of inkjet ink prints a solid block, in the 4 pass mode, to between 180 cm and 230 cm long before the cartridge is exhausted. The results were reported as good (entire print block had uniform color density and an absence of banding being observed), fair (the ink was printable with some banding observed), poor (the ink was printable with excessive banding observed), and very poor (the ink would not print).

Preparation of Butyl Amide of Bis-azlactone (MW861)

Into a 946 mL (32 oz.) glass jar was placed 138 g of Bayer Aspartic Ester XP 7059E (available from The Bayer Co., Pittsburgh, Pa.) and 84 g of vinyldimethyl azlactone (available from SNPE Co., Princeton, N.J.). The jar was sealed and placed in an air circulating oven at 65° C. for 3 days. The jar was then removed from the oven, cooled, and opened, and 44 g of n-butylamine was added in portions over 30 minutes. The jar was sealed and placed back in the oven at 65° C. overnight. The jar was then removed from the oven, cooled, and opened, and 200 mL of ethanol and 230 mL of 5N sodium hydroxide was added. The jar was warmed on a steam bath and the reaction mixture was agitated briefly until the reaction mixture was dissolved. Then the reaction mixture solution was allowed to stand overnight at room temperature. Most of the ethanol was then removed by evaporation at reduced pressure and the rest of the ethanol was extracted with three 250 mL portions of ethyl acetate. The aqueous solution was placed under reduced pressure again to remove any remaining organic solvent. Sufficient water was then added to make a 50 percent solution of butyl amide of bis-azlactone (MW861) in water.

Comparative Example 2

Four aqueous pigmented ink jet inks were prepared from either an aqueous concentrated magenta pigment dispersion (Sun Magenta QHD-6040, available at 39 percent solids from Sun Chemical Corp., Cincinnati, Ohio), an aqueous concentrated yellow pigment dispersion (Sun Yellow YGD-8851, 36 percent solids), an aqueous concentrated cyan pigment dispersion (Sun Cyan BCD-9941, 45 percent solids), or an aqueous concentrated black pigment dispersion (Sun LHD-9303, 49 percent solids). Each aqueous pigmented inkjet ink was prepared by diluting the pigment dispersion in the parts shown in Table 4 with first water, that had previously been adjusted to a pH of 9 with 1 NaOH, and 0.1 parts of SURFYNOL™ DF-58 (a defoamer available from Air Products and Chemicals, Inc., Allentown, Pa.) while the dispersion was being mixed with a SILVERSON™ Model L2AIR Heavy Duty Laboratory Mixer Emulsifier (available from Silverson Machines, Ltd.) at 2000 rpm for 5 min. Then diethyleneglycol (DEG) was gradually added while the mixture was further mixed for 10 min. While the DEG was added, the pH of the mixture was monitored and maintained at 9 with 1N sodium hydroxide.

TABLE 14

| Pigment Type | Dispersion parts | Water parts | DEG parts |
|---|---|---|---|
| Sun Magenta QHD-6040 | 41 | 128 | 230 |
| Sun Yellow YGD-8851 | 44 | 125 | 230 |
| Sun Cyan BCD-9941 | 35 | 134 | 230 |
| Sun Black LHD-9303 | 33 | 137 | 230 |

The ink mixture was then passed through a 5 micron Whatman Polycap 36 HD filter and evaluated for stripe print test quality on a Novajet II Thermal Inkjet Printer. The print results are shown in Table 15 and illustrate that the inkjet inks were never dispersed sufficiently to even pass the first stripe print test.

TABLE 15

| Pigment Type | Time (weeks) |
|---|---|
| Sun Magenta QHD-6040 | <0.5 |
| Sun Yellow YGD-8851 | <0.5 |
| Sun Cyan BCD-9941 | <0.5 |
| Sun Black LHD-9303 | <0.5 |

Comparative Example 3

Four aqueous pigmented ink jet inks were prepared as in Comparative Example 2 and were further processed. For each pigment, about 400 mL of ink was passed through a Model 15-15MR-STBA Homogenizer (available from APV Gaulin Inc.,) at 55 MPa (8000 psi, recirculated, and passed through until the ink was passed through an average of 4 cycles in all. The ink had a final temperature of about 85° C. The ink was then filtered, loaded into a cartridge, and the color stripe time was measured. The print results are shown in Table 6 and illustrate that the inkjet inks were never dispersed sufficiently to even pass the first stripe print test.

TABLE 16

| Pigment Type | Time (weeks) |
|---|---|
| Sun Magenta QHD-6040 | <0.5 |
| Sun Yellow YGD-8851 | <0.5 |
| Sun Cyan BCD-9941 | <0.5 |
| Sun Black LHD-9303 | <0.5 |

Example 9

Four aqueous pigmented ink jet inks were prepared as in Comparative Example 2 and were further processed. For each pigment, about 250 mL of ink was placed in a feed hopper, pressurized with a pneumatic pump to between 69 MPa and 103 MPa (10,000 psi and 15,000 psi) and forced through an interactive chamber H230Z (with a slot height of 400 microns and available from Microfluidics International Corp., Newton, Mass.) followed by an interactive chamber H210Z (with a slot height of 200 microns and available from Microfluidics International Corp.). The flow rate was kept constant at 400 mL/min and the ink was recirculated through the two interactive chambers for a total of 10 cycles. The temperature of the ink was kept to 55° C. with chilled water. The ink was then filtered, loaded into a cartridge, and measured for both color stripe time and full cartridge life. The print results are shown in Table 17 and illustrate that the inkjet inks were somewhat dispersed when the ink was passed through interaction chambers in series with decreasing openings.

TABLE 17

| Pigment Type | Time (weeks) | Cartridge |
|---|---|---|
| Sun Magenta QHD-6040 | 1 | fair |
| Sun Yellow YGD-8851 | 2 | good |
| Sun Cyan BCD-9941 | 1 | fair |
| Sun Black LHD-9303 | 1 | fair |

Example 10

Four aqueous pigmented ink jet inks were prepared as in Comparative Example 2 and were further processed. For each pigment, about 250 mL of ink was placed in a feed hopper, pressurized with a pneumatic pump to between 159 MPa and 172 MPa (23,000 psi and 25,000 psi) and forced through a series of three jet impingement assemblies each with a smaller orifice inner diameter than the preceding jet impingement assembly. The inner orifice diameters were 0.46 mm (0.018 in.), 0.30 mm (0.012 in.), and 0.23 mm (0.009 in.). A fixed free distance of 1.27 mm (0.05 in.) was used. The flow rate was kept constant at 400 cc/min. and the ink mixture was recirculated through the series of impingement assemblies and back to the feed hopper for 10 cycles. The impingement assemblies were immersed in a mixture of ice and water such that the final ink mixture temperatures, measured by a thermometer placed in the feed hopper, were approximately 45° C. The ink was then filtered, loaded into a cartridge, and measured for both color stripe time and full cartridge life. The print results are shown in Table 18 and illustrate that the inkjet inks were well dispersed when a series of impingement assemblies were used with decreasing orifice diameters.

TABLE 18

| Pigment Type | Time (weeks) | Cartridge |
|---|---|---|
| Sun Magenta QHD-6040 | 6 | good |
| Sun Yellow YGD-8851 | >16 | good |
| Sun Cyan BCD-9941 | 12 | poor |
| Sun Black LHD-9303 | 12 | fair |

Comparative Example 4

Four aqueous pigmented ink jet inks were prepared as in Comparative Example 2 and were further processed. For each pigment, about 250 mL of ink was placed in a feed hopper, pressurized with a pneumatic pump to between 159 MPa and 172 MPa (23,000 psi and 25,000 psi) and forced through a series of three jet assemblies each with a smaller orifice inner diameter than the preceding jet assembly. The inner orifice diameters were 0.46 mm (0.018 in.), 0.30 mm (0.012 in.), and 0.23 mm (0.009 in.). The flow rate was kept constant at 400 cc/min. and the ink mixture was recirculated through the series ofjet orifices and back to the feed hopper for 10 cycles. The assemblies were immersed in a mixture of ice and water such that the final ink slurry temperatures, measured by a thermometer placed in the feed hopper, were approximately 45° C. The ink was then filtered, loaded into a cartridge, and measured for full cartridge life.

TABLE 19

| Pigment Type | Distance (cm) |
|---|---|
| Sun Magenta QHD-6040 | good |
| Sun Yellow YGD-8851 | good |
| Sun Cyan BCD-9941 | poor |
| Sun Black LHD-9303 | poor |

Example 11

A pigment slurry concentrate was prepared by first adding 86.5 parts of SUNFAST™ Blue 15:3 (a cyan presscake, 50 percent pigment in water, available from Sun Chemical Co.), 25 parts of a 50 percent butyl amide bis-azlactone resin (MW861) in water solution, 15 parts of CT-136 (a surfactant available from Air Products Co.), and 50 parts water to 200 parts of diethyleneglycol (DEG) in a container. The pigment slurry was then mixed in a SILVERSON™ Model L2AIR Heavy Duty Laboratory Mixer Emulsifier at 500 rpm for 5 minutes followed 2000 rpm for 10 minutes such that sediment was not observed at the bottom of the container. The pigment slurry concentrate was washed with an additional 30 parts of water. About 250 mL of the pigment slurry concentrate was placed in a feed hopper, pressurized with a pneumatic pump to between 83 MPa and 90 MPa (12,000 psi and 13,000 psi) and forced through an interactive chamber H230Z (with a slot height of 400 microns) followed by an interactive chamber H210Z (with a slot height of 200 microns). The flow rate was kept constant at 400 mL/min and the pigment slurry concentrate was recirculated through the two interactive chambers for a total of 24 cycles. The interactive chambers were immersed in a mixture of ice and water such that the final ink mixture temperatures, measured by a thermometer placed in the feed hopper, were approximately 45° C.

About 400 mL of inkjet ink was prepared by adding water and DEG to the pigment slurry concentrate in a similar manner as described in Comparative Example 2 except the pH was maintained at 8. The inkjet ink was then filtered, loaded into a cartridge, and measured for full cartridge life. The full cartridge life was fair.

Example 12

An inkjet ink was prepared as in Example 11 except that the pigment slurry concentrate was fed under different conditions through jet impingement assemblies instead of interaction chambers. About 250 mL of the pigment slurry concentrate was placed in a feed hopper, pressurized with a pneumatic pump to between 138 MPa and 172 MPa (20,000 psi and 25,000 psi) and forced through a series of three jet impingement assemblies each with a smaller orifice inner diameter than the preceding jet impingement assembly. The inner orifice diameters were 0.46 mm (0.018 in.), 0.30 mm (0.012 in.), and 0.23 mm (0.009 in.). A fixed free distance of 1.27 mm (0.05 in.) was used. The flow rate was kept constant at 400 cc/min. and the pigment slurry concentrate was recirculated through the series of impingement assemblies and back to the feed hopper for 24 cycles. The impingement assemblies were immersed in a mixture of ice and water such that the final ink mixture temperatures, measured by a thermometer placed in the feed hopper, were approximately 45° C. Inkjet ink was then prepared from the pigment slurry concentrate, filtered, loaded into a cartridge, and measured for full cartridge life. The full cartridge life was good.

Comparative Example 5

An inkjet ink was prepared as in Example 11 except that the pigment slurry concentrate was fed under different conditions through jet assemblies instead ofjet impingement assemblies. About 250 mL of the pigment slurry concentrate was placed in a feed hopper, pressurized with a pneumatic pump to between 159 MPa and 172 MPa (23,000 psi and 25,000 psi) and forced through a series of three jet assemblies each with a smaller orifice inner diameter than the preceding jet impingement assembly. The inner orifice diameters were 0.46 mm (0.018 in.), 0.30 mm (0.012 in.), and 0.23 mm (0.009 in.). The flow rate was kept constant at 400 cc/min. and the ink mixture was recirculated through the series ofjet assemblies and back to the feed hopper for 24 cycles. The impingement assemblies were immersed in a mixture of ice and water such that the final pigment slurry concentrate temperatures, measured by a thermometer placed in the feed hopper, were approximately 45° C. Inkjet ink was then prepared from the pigment slurry concentrate, filtered, loaded into a cartridge, and measured for full cartridge life. The full cartridge life was good.

Example 13

This experiment demonstrates the advantage of having a orifice assembly which is free to vibrate at the exit. The dispersion used was 12.4% by weight carbon black, and 7% by weight nitrocellulose in TBF based on total weight of the dispersion. The jet impingement system had 8 impingement chambers in series. The dispersion was first run through the chambers which included one chamber having orifice exits that were not substantially free to vibrate. Specifically, this orifice chamber had a distance from the point of support of the orifice assembly to the exit of the orifice assembly of 0.0375 in. (0.09525 cm). The distance from the exit of the orifice assembly to the point of impingement was 0.03 in (0.0762 cm). Ratio=12.5. An identical dispersion was then passed through a second jet impingement system which included one chamber having orifice exits that were substantially free to vibrate. Specifically, this orifice chamber had a distance from the point of support of the orifice assembly to the exit of the orifice assembly of 0.0375 in. (0.09525 cm). The distance from the exit of the orifice assembly to the point of impingement was 0.0275 in (0.06985 cm). Ratio=13.6. The dispersion were passed through these two systems with a total pressure drop of 30,000 psi and a pressure drop over the last impingement chamber which was being varied or 17,500 psi. The fixed nozzles showed substantial erosion after only 30 minutes. The free nozzles showed no substantial wear after extended operation.

What is claimed is:

1. A process for producing a dispersion comprising a liquid and a hard, non-compliant particle, in which the process comprises the steps of:

a) combining the dispersion components to form a semi-dispersed mixture;

b) pressurizing the mixture; and c) forcing the pressurized mixture through a series of at least two impingement chamber assemblies, wherein the mixture is divided into at least two streams, each stream is forced through an orifice assembly comprising a small orifice with an inner diameter, and, on exit from the orifice assembly, the streams impinge upon each other, wherein the inner diameters ofthe orifices of the first impingement chamber assembly are larger than the inner diameters of the orifices in the last impingement chamber assembly.

2. The process of claim 1 wherein the distance from exit of the stream from the orifice assembly to the point of impingement is no more than two times the diameter of the orifice.

3. The process of claim 1 wherein the exit of the orifice assemblies are free to vibrate.

4. The process of claim 1 wherein the particle is a magnetic pigment.

5. The process of claim 1 wherein the pressure drop across the series of impingement chamber assemblies is at least 205 MPa.

6. The process of claim 1 in which the dispersion further comprises a polymeric binder.

7. The process of claim 1 further comprising the steps of repressurizing and recycling at least a portion of the processed dispersion through the series of impingement chamber assemblies.

8. The process of claim 1 wherein the forcing step comprises dividing the mixture into two streams and impinging the streams impinge upon each other at an angle of 180 degrees.

9. The process of claim 1 in which the forcing step comprises forcing the streams through orifice assemblies which comprise an element, defining the small orifice, held within an orifice cone, wherein after passing through the orifice each stream passes through an extension tube.

10. The process of claim 1 in which the forcing step comprises forcing the streams through the orifices at rates of at least 300 meters per second.

11. The process of claim 1 in which the forcing step comprises forcing the mixture through 3 to 9 impingement chamber assemblies.

12. The process of claim 1 in which the forcing step comprises forcing the streams through cylindrical orifices which have inner diameters ranging from 0.1 through 1.0 mm.

13. The process of claim 1 wherein the amount of hard, non-compliant particle is up to 60% by volume of the dispersion.

14. The process of claim 4 wherein in amount of magnetic pigment is in the range of 20–50% by weight.

15. The process of claim 1 in which the combining step comprises mixing at least the particle and a portion of the liquid in a double planetary mixer followed by adding at least the remainder of the liquid.

16. The process of claim 15 wherein polymeric binder is added after mixing in a double planetary mixer.

17. The process of claim 1 wherein the particle is a color pigment.

* * * * *